United States Patent [19]

Tessier et al.

[11] Patent Number: 4,831,888
[45] Date of Patent: May 23, 1989

[54] LINEAR GUIDING SYSTEM INCORPORATING ROLLING MEMBERS AND ADJUSTING DEVICE FOR SUCH A SYSTEM

[75] Inventors: Marie C. Tessier, Puiseaux; Georges Gaillard, Beaune la Rolande, both of France

[73] Assignee: Micro-Controle, Evry, France

[21] Appl. No.: 92,201

[22] Filed: Sep. 2, 1987

[30] Foreign Application Priority Data

Sep. 23, 1986 [FR] France .................................. 8613257

[51] Int. Cl.[4] ................................................ G01L 5/00
[52] U.S. Cl. ................................................ 73/862.54
[58] Field of Search .......................... 73/862.54, 862.5; 33/1 M, 1 AA; 248/542, 655, 657; 384/10

[56] References Cited

U.S. PATENT DOCUMENTS 3,778,121 12/1973 Levesque .............................. 384/10
4,648725 3/1987 Takahasi ........................... 384/10 X Primary Examiner—Jerry W. Myracle
Attorney, Agent, or Firm—Fisher, Christen & Sabol

[57] ABSTRACT

A linear guiding system incorporating rolling members, having a central element and a peripheral element connected to each other by at least one pair of rolling member assemblies associated with blocks fixed on the peripheral element by means of screws, and disposed opposite one another on either side of the central element. There is a device for adjusting the pressure exerted by the rolling members on the central element when the fixing screws are loosened. The pressure adjusting device is outside of the guiding system and is adapted to be temporarily fast with the blocks, and comprises apparatus for measuring the pressure exerted by the rolling members on the central element.

13 Claims, 2 Drawing Sheets

LINEAR GUIDING SYSTEM INCORPORATING ROLLING MEMBERS AND ADJUSTING DEVICE FOR SUCH A SYSTEM

The present invention relates to a linear guiding system incorporating rolling members, of the type comprising a central element and a peripheral element, connected to each other by at least one pair of rolling member assemblies which are borne by said peripheral element and which are disposed one opposite the other, on either side of said central element.

In such a guiding system, said central element may be a guiding rail, said peripheral element in that case being a carriage capable of sliding along said rail. As a variant, said peripheral element may be a base and said central element may be a plate capable of moving in linear translation with respect to said base.

For the guiding obtained by such a system to be precise, it is necessary that said rolling members of two opposite assemblies be in abutment against runways provided on said central element. However, the pressure exerted by said rolling members on said central element must not generate a high friction. In this way, this pressure must be both sufficiently high for the precision of guiding to be good, but sufficiently low for the friction not to be too high.

In the known guiding systems of this type, said peripheral element presents a section at least approximately in the form of a U or a C and each of said rolling member assemblies is disposed in the vicinity of one of the flanges of this element, parallel to the direction of relative displacement of said central and peripheral elements. Consequently, it is possible to provide, for at least one of said rolling member assemblies, at least one pressure adjusting device, such as a screw, abutting on one of said flanges to press the corresponding roller member assembly in the direction of said central element. In this way, by acting on the or each pressure screw, it is possible to vary the pressure (often called "pre-stress") exerted by the rolling members of the two assemblies of a pair on said central element. However, such an embodiment presents drawbacks:

1. Firstly, it obliges said peripheral element to be made with a U- or C-section, which is not necessarily advantageous, particularly when this peripheral element is the base of a mobile plate (central element). In fact, in that case, it may be preferable that said base be formed by a simple plate.

2. Secondly, it is impossible to adjust the pre-stress to the theoretically desired value. Action on the pressure screws makes it possible to increase or decrease this pre-stress, but does not enable a determined value to be communicated thereto. Adjustment of pre-stress is therefore left to the know-how and competence of the operator. This may result in imprecise guiding or premature wear of said guiding systems and excess drive powers. Moreover, when the guiding system comprises several peripheral elements connected together and associated with the same central element, it may be detrimental if the pre-stresses of the different peripheral elements are not adjusted to the same value.

It is an object of the present invention to overcome these drawbacks. To that end, the linear guiding system incorporating rolling members, of the type comprising a central element and a peripheral element connected to each other by at least one pair of rolling member assemblies associated with blocks fixed on said peripheral element by means of screws, and disposed opposite one another on either side of said central element, as well as a device for adjusting the pressure exerted by said rolling members on said central element when said fixing screws are loosened, is noteworthy, according to the invention, in that said pressure adjusting device is outside said guiding system and adapted to be temporarily fast with said blocks, and comprises means for measuring the pressure exerted by said rolling members on said central element.

In this way, according to the invention, the pre-stress or the pressure exerted by the rolling members on said central element is adjusted to the desired theoretical value, corresponding to the optimalization of the compromise between precision of guiding and friction, thanks to the temporary addition of the adjusting device directly in said blocks. Moreover, the obligation of having a peripheral element in U-form is thus avoided.

In a preferred embodiment, said adjusting device may be constituted by at least two substantially parallel columns, disposed on either side of said central element substantially in a plane perpendicular to the direction of linear guiding, and capable of coming respectively into engagement with said blocks, and by adjusting means capable of varying the spaced apart relationship of said columns, said measuring means being associated with said adjusting means, and making it possible to determine the force exerted by said columns on said central element via the blocks.

In a particular embodiment, said adjusting means are constituted by a screw-nut mechanism comprising a threaded rod, engaging in holes for passage made respectively in said columns, by coming into abutment by one end against one of them, said threaded rod opening out from the other column and receiving an adjusting nut. Said measuring means are advantageously constituted by a dynamometer of the type with spring disposed between said adjusting nut and said column located opposite said nut, the latter being provided with a graduated indicator with which said adjusting nut cooperates. In this way, the position of the adjusting nut with respect to the graduated indicator corresponds, as a function of the calibration of the spring, to a determined force exerted by said columns on the central element via the blocks.

According to another feature of the invention, in each block bearing a rolling member assembly, there is provided a bore in which the end of a column is capable of being inserted.

The invention relates, although not exclusively, to guiding systems in which the blocks are of the type with circulation of balls, and more particularly blocks disposed on either side of said central element, each bearing two superposed rolling member assemblies, said central element thus being guided by two pairs of rolling member assemblies.

In a preferred embodiment, those parts of said columns capable of being inserted in said bores in the blocks present a convex lateral support projection.

The points of contact between said convex projection and the walls of the corresponding bore in each block are advantageously located in a median plane parallel to the planes formed by the pairs of rolling member assemblies. In this way, the action of the efforts exerted by each column on the rolling member assemblies of each of the blocks in abutment on the runways of the central element is symmetrical and of equal intensity.

The present invention also relates to the adjusting device intended for a linear guiding system incorporating rolling members comprising a central element and a peripheral element connected to each other by at least one pair of rolling member assemblies associated with blocks fixed on said peripheral element by means of screws, and disposed opposite each other on either side of said central element, said adjusting device making it possible to adjust the pressure exerted by said rolling members on said central element when said screws for fixing said blocks are loosened.

The device is noteworthy in that it is capable of being rendered temporarily fast with said system and it comprises means for measuring the pressure exerted by said rolling members on said central element.

According to a preferred embodiment, it is constituted by at least two substantially parallel columns capable of coming respectively into engagement with said blocks, and by adjusting means capable of varying the spaced apart relationship of said columns, said measuring means being associated with said adjusting means, and make it possible to determine the force exerted by said columns on said central element via the blocks. Said adjusting means may advantageously be constituted by a screw-nut mechanism comprising a threaded rod capable of engaging in holes for passage made respectively in said columns, by coming into abutment by one end against one of them, said threaded rod opening from the other column and receiving an adjusting nut.

In one embodiment, said measuring means may be constituted by a dynamometer of the type with spring disposed between said adjusting nut and said column located opposite said nut, said column being equipped with a graduated indicator with which said adjusting nut cooperates.

The invention will be more readily understood on reading the following description with reference to the accompanying drawings, in which.

Figure 1:
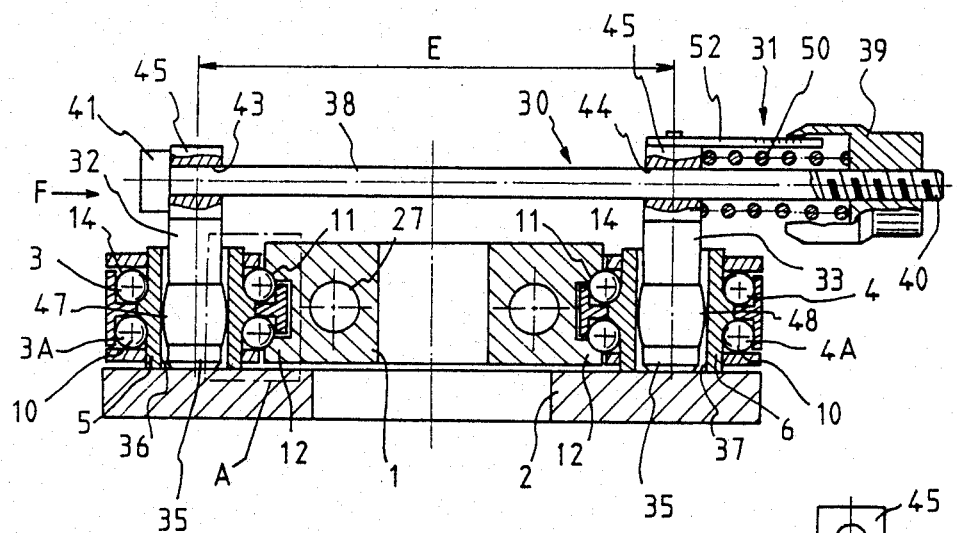
FIG. 1 represents, in section, a particular embodiment of a linear guiding system incorporating rolling members, improved according to the invention.
Figure 2:
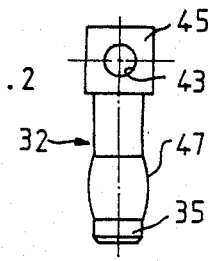
FIG. 2 is a side view, in the direction of arrow F in FIG. 1, of one of the columns constituting the adjusting device.

Referring now to the drawings, the linear guiding system incorporating rolling members, shown therein, comprises a central element, such as a plate 1 capable of being displaced in a peripheral element, such as a base 2, via assemblies 3 and 4 of rolling members associated respectively with blocks 5 and 6 fixed to the base 2, and disposed opposite each other on either side of the plate 1.

In a variant embodiment (not shown), said central element may be a guide rail, and said peripheral element a carriage adapted to slide along the rail, without hereby departing from the scope of the invention.

In the example described with reference to FIGS. 1 to 5, the plate 1 may bear, fast therewith, a precision instrument of which the displacement must be as fine and precise as possible, while the base 2 may be fixed to a rigid pedestal.

Figure 4:
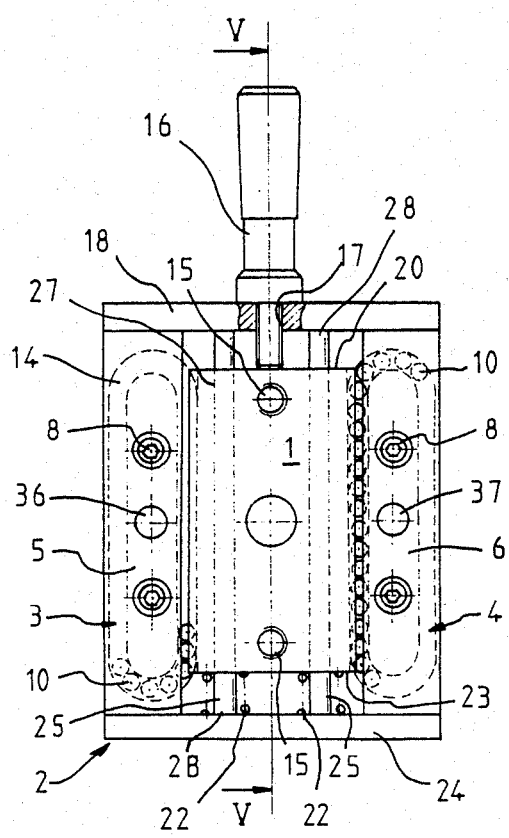
FIG. 4 represents a plan view of the guiding system shown with regard to FIG. 1.

Each block 5 and 6, disposed on either side of the plate 1, is fixed to the base 2 by screws 8 visible in FIG. 4, and advantageously comprises two rolling member assemblies, on the one hand, 3 and 3A, and, on the other hand, 4 and 4A, superposed with respect to each other.

In this way, the plate 1 is guided by two pairs of rolling member assemblies, a first pair formed by the assemblies 3 and 4 contained in the same horizontal plane, and a second pair formed by the assemblies 3A and 4A contained in another horizontal plane parallel to the preceding one.

The rolling members, such as balls 10, cooperate with runways 11 made in the corresponding edges 12 of the plate 1, and circulate in raceways 14 made in the blocks 5 and 6. These runways are of known type and will therefore not be described in greater detail. The balls 10 are imprisoned in these raceways, and are free to rotate on themselves.

Figure 5:
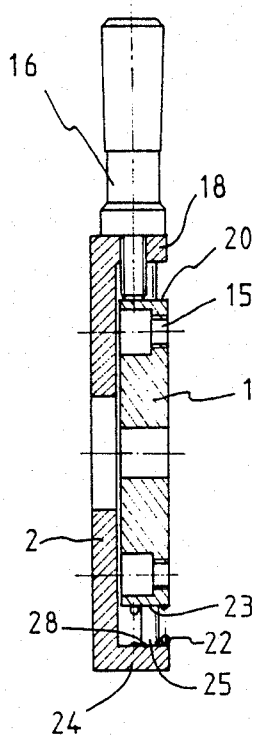
FIG. 5 is a view in section of the guiding system along line V—V of FIG. 4.

Referring now to FIGS. 4 and 5, holes 15 for fixation are provided in the plate 1 in order to be able to connect, for example, a precision instrument (not illustrated). These holes 15 are pierced perpendicularly to the planes of said pairs of rolling member assemblies, and therefore to the direction of guiding of the plate.

In order to ensure displacement of the plate 1 with respect to the base 2, a micrometric screw 16 is mounted in a tapped hole 17 made in one, 18, of the transverse edges of the base 2. The screw 16, manipulated by an operator, makes it possible to act on one, 2C, of the lateral faces of the plate 1, this provoking its displacement and guiding on the rolling members.

The plate 1 moves against two springs 22 disposed between the lateral face opposite the preceding one, 20, and the other transverse edge 24 of the base 2. Each spring 22 is borne by a guide 25 passing through the plate 1 by its lateral faces 20 and 23 thanks to an orifice 27 provided therein. The ends 28 of each guide 25 are mounted in the transverse edges 18 and 24 of the base 2.

The plate 1 may thus occupy any position included between, on the one hand, a first end position corresponding to the one wheel the lateral face 20 of the plate is in abutment against the transverse edge 18 and, on the other hand, a second end position corresponding to the one where the lateral face 23 of the plate compresses the springs 22 so that their turns are contiguous, against the transverse edge 24.

The quality of such a guiding system resides in particular in the precision of the guiding of the plate with respect to the base. Consequently, it is necessary that the pre-stress or the pressure exerted by the rolling members on the runways of the plate be adjusted with precision for the reasons set forth hereinbefore and to obtain optimization of the compromise between precision of guiding and friction. To this end, the guiding system comprises a device 30 for adjusting the pre-stress exerted by these rolling members on the runways of the plate.

According to the invention, this adjusting device 30 is outside said guiding system proper, and adapted to be rendered temporarily fast with the blocks 5 and 6, and comprises means 31 for measuring the pressure exerted by the rolling members on the runways of the plate. Of course, the adjustment made by device 30 is effected when the screws 8 for fixing the blocks 5 and 6 on the base 2 are loosened.

The adjusting device 30 according to the invention is, for example, constituted by two identical, substantially parallel columns 32 and 33, capable of being disposed on either side of the plate 1 substantially transversely to the direction of linear guiding of the plate with respect to the base 2, and by adjusting means capable of varying the spaced apart relationship of the columns 32 and 33. More precisely, these columns 32 and 33 are capable of coming into engagement with blocks 5 and 6. To that end, the lower end 35 of each column 32 and 33 is inserted in a bore 36 and 37 provided in each of the blocks 5 and 6.

The adjusting means are constituted by a screw-nut mechanism comprising a rod 38, threaded at one end 40 and terminating at its other end in a base 41, and an adjusting nut 39 screwed on the threaded end 40. The rod 38 is introduced by its threaded end 40 into holes for passage 43 and 44 provided respectively at the upper end 45 of the columns 32 and 33. The upper end 45 thereof is of rectangular section (FIG. 2) so that the base 41 of the rod 38 comes appropriately into abutment against one of the faces of the end 45 of the column 32.

The threaded end 40 opening out of the hole of passage 44 of the column 33 receives the adjusting screw 39. These adjusting means thus make it possible to vary tee spaced apart relationship, symbolized by the dimension "E" shown in FIG. 1, between the two columns 32 and 33. The measuring means 31, associated with the adjusting means, make it possible to adjust the force exerted by the columns on said central element via the blocks 5 and 6, when the latter are in engagement with said blocks. Each lower end 35 of the columns 32 and 33, which is inserted in the bores 36 and 37 of the blocks 5 and 6 until it comes into contact with the base 2, advantageously presents a convex lateral support projection 47 and 48. The points of contact 49 between the convex projection and the part of the corresponding bore of each block are located in a median plane parallel to the planes formed by the pairs of rolling member assemblies.

In a particular embodiment, the measuring means 31 are constructed by a dynamometer 50 of the type with spring, mounted around the threaded end 40 of the rod 38, and disposed between the adjusting nut 39, screwed on the threaded part 40, and the column 33. The latter in that case comprises on its top a graduated indicator 52 about which the nut 39 is capable of moving. Consequently, the position of the adjusting nut 39 with respect to the graduated indicator 52 corresponds, as a function of the calibration of the spring 50, to a determined effort exerted by the columns 32 and 33 on the central element or plate 1 via the blocks 5 and 6.

The adjusting device 30 is positioned in the guiding system by the introduction of the lower end parts 35 of the columns 32 and 33 respectively in the bores 36 and 37 of the blocks 5 and 6. The end parts 35, machined with care, rest on the upper face 54 of the base 2. The screws 8 for fixing tee blocks 5 and 6 fixed on the base 2 are loosened. In this way, each block may move, with respect to the base 2, by an amplitude, which is certainly very limited, corresponding to the functional clearances between the threading of the screws 8 and the tapping of the holes (not visible in the Figures) made in the base 2 and receiving the screws 8.

Adjustment of the pre-stress exerted by the rolling member assemblies 3, 3A, 4 and 4A against the runways 11 of the plate 1 is obtained by screwing the nut 39, on the threaded end 40 of the rod 38. Such screwing then brings about a compression of spring 50 and a decrease in the dimension "E" of the distance separating the two columns 32 and 33, The position of the nut 39 with respect to the graduations made on the graduated indicator 52 connected to the column 33 corresponds to a value representative of the force exerted by the columns 32 and 33 on the plate 1 via the blocks 5 and 6, i.e. The pre-stress exerted by the rolling member assemblies 3, 3A, 4 and 4A against the runways 11 of plate 1.

Figure 3:
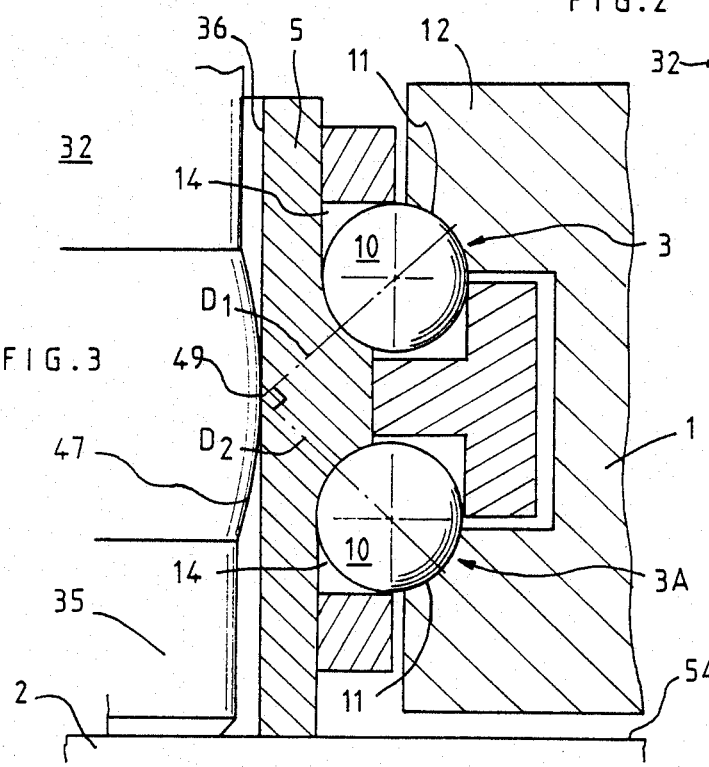
FIG. 3 is a view on a larger scale of detail A of FIG. 1.

As shown more precisely in FIG. 3, the force exerted by column 32 of plate 1 is applied to the points of contact 49 between the convex lateral support projection 47 and the inner wall of the bore 36 made in the block 5. An identical and symmetrical force is exerted by column 33 on the plate 1 via the block 6. Since the points of contact 49 of the convex projections 47 and 48 of the columns with the inner wall of the bores 36 and 37 are located in the same median plane parallel to the planes of each pair of rolling member assemblies, the force exerted by each column is distributed in identical manner on each of the rolling member assemblies of the same block, in the two directions $D_1$ and $D_2$ shown in dashed and dotted lines (FIG. 3), each passing through the centre of the balls 10 in contact with the runways 11. The angle formed by the directions $D_1$ and $D_2$ corresponds substantially to a right angle.

Blocks 5 and 6 are thus pressed towards each other against the runways 11 of plate 1, thanks to the action of columns 32 and 33. Balls 10 exert a determined pre-stress, as a function of the calibration of the spring 50 and of the position of the nut 39 on the graduated indicator 52, on each runway 11. When adjustment of the pre-stress is terminated, the screws 8 for fixing the blocks 5 and 6 on the base 2 are tightened to the appropriate torque. The device may then be withdrawn. In this way, thanks to the temporary addition of the adjusting device directly in the blocks, the desired value of the pre-stress exerted by the rolling members on the plate, and corresponding to the optimization of the compromise between precision of guiding and friction, is obtained.

What is claimed is:
1. Linear guiding system comprising:
   a central element (1);
   a peripheral element (2);
   at least one pair of blocks (5,6) fixed on said peripheral element by means of fixing screws add provided with rolling member assemblies (3,4), the two blocks of one pair being disposed opposite one another on either side of said central element and said rolling member assemblies of said opposite blocks connecting said central and peripheral elements;
   a device (30) for adjusting the pressure exerted by said rolling members on said central element (1) when said fishing screws are loosened, said adjusting device (30) being detachable and adapted to be temporarily fast with said opposite blocks; and
   measuring means (31) for measuring the pressure exerted by said rolling members on said central element.

2. The guiding system of claim 1 wherein said adjusting device comprises at least two substantially parallel columns, disposed on either side of said central element substantially in a plane perpendicular to the direction of linear guiding, and capable of coming respectively into engagement with said blocks, and adjusting means capable of varying the spaced apart relationship of said columns, said measuring means being associated with said adjusting means, and making it possible to determine the force exerted by said columns on said central element via the blocks.

3. The guiding system of claim 2, wherein said adjusting means comprises a screw-nut mechanism comprising a threaded rod, engaging in holes for passage made respectively in said columns, by coming into abutment by one end against one of them, said threaded rod opening out from the other column and receiving an adjusting nut.

4. The guiding system of claim 1, wherein said measuring means comprises a dynamometer of the type with spring disposed between said adjusting nut and said column located opposite said nut, the latter being provided with a graduated indicator with which said adjusting nut cooperates.

5. The guiding system of claim 1, wherein, in each block bearing a rolling member assembly, there is provided a bore in which tee end of a column is capable of being inserted.

6. The guiding system of claim 1, in which said blocks are of the type with circulation of balls, wherein said blocks, disposed on either side of said central element, each bear two superposed rolling member assemblies, said central element thus being guided by two pairs of rolling member assemblies.

7. The guiding system of claim 6, wherein those parts of said columns capable of being inserted in said bores in the blocks present a convex lateral support projection.

8. The guiding system of claim 7, wherein the points of contact between said convex lateral support projection and the wall of the corresponding bore in each block are located in a median plane parallel to the planes formed by the pairs of rolling member assemblies.

9. Adjusting system for a linear guiding system comprising:
   central element (1);
   a peripheral element (2); and
   at least one pair of blocks (5,6) fixed on said peripheral element by means for fixing screws and provided with rolling member assemblies (3,4), the two blocks of one pair being disposed opposite one another on either side of said central element and said rolling member assemblies of said opposite blocks connecting said central and peripheral elements;
said adjusting system comprising;
   a device for adjusting the pressure exerted by said rolling members on said central element (1) when said fixing screws are loosened, said adjusting device (30) being detachable and adapted to be temporarily fast with said opposite blocks; and
   measure means (31) for measuring the pressure exerted by said rolling members on said central element 10. The adjusting device of claim 9, wherein said adjusting device comprises at least two substantially parallel columns capable of coming respectively into engagement with said blocks, and adjusting means capable of varying the spaced apart relationship of said columns, said measuring means being associated with said adjusting means, and make it possible to determine the force exerted by said columns on said central element via the blocks.

11. The adjusting device of claim 10, wherein said adjusting means comprises a screw-nut mechanism comprising a threaded rod capable of engaging in holes for passage made respectively in said columns, by coming into abutment by one end against one of them, said threaded rod opening from the other column and receiving an adjusting nut.

12. The device of claim 10, wherein an end part of said columns presents a convex lateral support projection.

13. The device of claim 9, wherein said measuring means comprises a dynamometer of the type with spring disposed between said adjusting nut and said column located opposite said nut, said column being equipped with a graduated indicator with which said adjusting nut cooperates.

* * * * *